ELECTRIC FREQUENCY STANDARD OSCILLATING SYSTEM

Filed June 25, 1952 4 Sheets-Sheet 1

Inventor
JERRY B. MINTER 2ND

By John J. Rogan
Attorney

May 8, 1956 J. B. MINTER, 2ND 2,745,061

ELECTRIC FREQUENCY STANDARD OSCILLATING SYSTEM

Filed June 25, 1952 4 Sheets-Sheet 2

Inventor
JERRY B. MINTER 2ND

By

John J. Rogan
Attorney

May 8, 1956 J. B. MINTER, 2ND 2,745,061

ELECTRIC FREQUENCY STANDARD OSCILLATING SYSTEM

Filed June 25, 1952 4 Sheets-Sheet 3

Inventor
JERRY B. MINTER 2ND

By John J. Logan
Attorney

Inventor
JERRY B. MINTER 2ND

By John J. Rogan
Attorney

United States Patent Office 2,745,061

Patented May 8, 1956

2,745,061

ELECTRIC FREQUENCY STANDARD OSCILLATING SYSTEM

Jerry B. Minter 2nd, Boonton, N. J., assignor to Measurements Corporation, Boonton, N. J., a corporation of New Jersey Application June 25, 1952, Serial No. 295,427

21 Claims. (Cl. 324—79)

This invention relates to systems for generating electric frequency standards, and more especially it relates to arrangements for comparing known electrical frequencies with an unknown electrical frequency or with electrical frequency sources to be calibrated.

A principal object of the invention is to provide an improved multi-frequency standards producing system.

Another principal object is to provide a multi-frequency standards arrangement for generating a very broad range of frequency standards with high efficiency over the complete frequency range.

Another object is to provide a novel arrangement of electron tubes and associated circuits for generating a very wide frequency spectrum with the various frequencies thereof accurately predeterminable and without using so-called harmonic amplifiers, multivibrators, broad band video amplifiers, and the like.

A feature of the invention relates to an electric frequency spectrum generating standard employing a novel combination of electron tubes and circuits for extending the useful harmonic range of a master oscillator such as a crystal-controlled oscillator and the like.

Another feature relates to an electrical frequency spectrum generating standard employing an improved plural cross-modulation arrangement.

Another feature relates to an improved oscillator arrangement for generating a wide range of multiplied and sub-divided frequencies under control of a highly stabilized oscillator such as crystal-controlled oscillator, and wherein the amplitudes of the harmonics at the higher ends of the multiplied spectrum and at the lower end of the sub-divided spectrum are commensurate, thus extending the useful frequency range of the system.

Another feature relates to a frequency calibrating or comparison device employing a master oscillator, such as a crystal-controlled oscillator, in conjunction with a frequency multiplying oscillator and a frequency dividing oscillator, all of which are interconnected in such a way as to maintain efficiency of spectrum output amplitude over substantially the entire range of multiplied and sub-divided frequencies.

A further feature relates to an electric frequency spectrum generator employing a master oscillator and a plurality of other oscillators, one of which is a frequency multiplying oscillator and the other a frequency dividing oscillator, in conjunction with a common mixer device which is excited by the respective oscillators for cross-modulation purposes with the assurance that "missing beats" are avoided.

A further feature relates to a simplified electric frequency spectrum generator employing multiple cross-modulation in a common mixer device and whereby the mixer output can be used as a source of high frequency harmonic standards.

A further feature relates to an improved electric frequency spectrum generator having an audio frequency amplifier-modulator circuit which is capable of modulating all the harmonics of the generator, while rendering the per cent of hum in the audio frequency modulated output substantially negligible.

A still further feature relates to the novel organization, arrangement and relative interconnection of parts which cooperate to provide an improved and simplified broad range frequency spectrum standards generator.

Other features and advantages not particularly enumerated, will become apparent after a consideration of the following detailed descriptions and the appended claims.

In the usual design of frequency calibrators or so-called frequency standard generators, it is common practice to employ a master oscillator such as a crystal-controlled oscillator as the standard source. As is well-known, such an oscillator produces in its output a fundamental frequency related to the fundamental frequency of the crystal, and a series of integrally-related harmonics of that fundamental frequency. Because of the rapid falling off in amplitude of the harmonics, as compared with the fundamental frequency, it has been the practice to use harmonic amplifiers to increase the output at the various harmonic frequencies. In order to secure sufficient output at the various harmonic frequencies, these harmonic amplifiers have in some cases been of the tuned type. Such tuned amplifiers are not very convenient either to operate, or to maintain, and as a compromise it has been proposed to amplify the frequency spectrum of the master oscillator in so-called broad-band video amplifiers. However, even in this proposed arrangement, there is a practical limit to the design of video amplifiers above several hundred megacycles. If, therefore, a frequency standard generator is required for calibrating or comparing unknown sources of more than a few hundred megacycles, comparatively complex and expensive equipment is required. The present invention overcomes the disadvantages of the prior-known frequency spectrum standards generator arrangements.

Figure 1A:
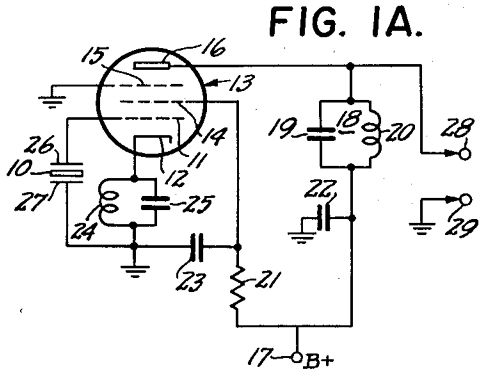
Fig. 1A is a schematic wiring diagram of a typical master oscillator used in practicing the invention.
Figure 1B:
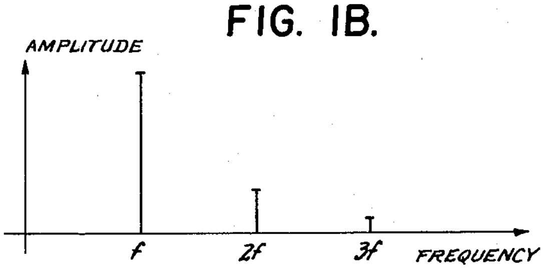
Fig. 1B is a graph showing the relative amplitudes of the various harmonic frequencies produced at the output of the oscillator of Fig. 1A.

Referring to Fig. 1, there is shown, in schematic form, any one of a number of well-known master oscillators. Usually this master oscillator comprises a piezoelectric crystal 10 which is connected for example across the control grid 11 and cathode 12 of a grid-controlled vacuum tube 13. Preferably, this tube is of a type wherein the output circuit can be electrostatically isolated from the input circuit, for example by means of the usual shield grid 14, and including preferably the well-known suppressor grid 15. The plate or anode 16 of the tube 13 is connected to the positive terminal 17 of a suitable direct current plate power supply through a tuned tank circuit 18, comprising for example the tunable capacitor 19 and the parallel-connected inductance 20. The shield grid 14 is connected through a suitable series resistor 21 to the positive direct current terminal 17. The usual by-pass condensers 22 and 23 are provided for decoupling the screen grid and anode circuits. The negative terminal of the direct current anode power supply may be grounded and returned to the cathode 12 through a suitable parallel-connected inductance 24 and condenser 25. The electrodes 26, 27, of the crystal can be connected respectively to the control grid 11 and to ground. Assuming, merely for purposes of explanation, that the oscillator above described is designed to generate under control of the crystal 10 a fundamental frequency of 10 megacycles, then, as is well known, such an oscillator produces a relatively high amplitude output at this fundamental frequency "*f*" as shown in Fig. 1B, and produces substantially lower amplitudes at the respective harmonic frequencies 2*f*, 3*f*. As shown in Fig. 1B, the harmonic output available at the terminals 28, 29, when the tank circuit 18 is tuned to the fundamental or crystal frequency, rapidly falls off along the spectrum, primarily due of course to the presence of the tuned circuits in the oscillator, particularly the tuned tank circuit 18. Such an oscillator, by itself therefore, has rather limited utility as a frequency spectrum standard, unless individual harmonic amplifiers are connected to the output to amplify the successive harmonics to a sufficiently high level, so that they are commensurate with the amplitude of the fundamental frequency.

Figure 2A:
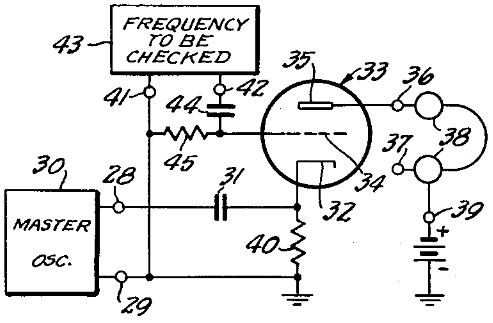
Fig. 2A shows one embodiment of the invention for increasing the useful range of the harmonic frequency output of a master oscillator such as shown in Fig. 1A.

I have found that it is possible to increase the useful harmonic range of such a master oscillator without the necessity of employing these harmonic amplifiers. This result is primarily achieved by using the modulation properties of a non-linear circuit, such for example as a product detector which is cross-modulated by the selected output from the terminals 28 and 29, with the unknown frequency or source of frequencies to be compared or calibrated. Such an arrangement is schematically illustrated in Fig. 2A wherein the master oscillator 30 may be an oscillator such as shown in Fig. 1A, with its output terminal 28 connected through a suitable coupling capacitor 31 to the cathode 32 of a product detector or modulation detector 33. This detector may comprise a grid-controlled vacuum tube having the usual electron-emitting cathode 32, control grid 34, and plate or anode 35. The plate 35 is connected to the pair of output terminals 36, 37, to which a suitable audio-frequency signal-producing device, such as a loudspeaker or head phones 38, can be connected, it being understood that the plate 35 is connected to the positive terminal 39 of a suitable direct current plate power supply, the negative terminal of which may be grounded and returned to the cathode 32 through the cathode biassing resistor 40. The terminal 29 of the master oscillator may likewise be connected to the common ground return.

Figure 2B:
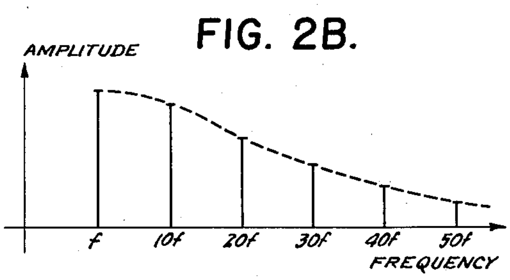
Fig. 2B is a graph showing the relative amplitudes of the various harmonics from the system of Fig. 2A.

The detector 33 has another pair of input terminals 41, 42, to which can be connected the source 43 of unknown frequency or frequencies to be calibrated. The terminal 42 is connected through a suitable coupling capacitor 44 to the control grid 34, which grid is returned to ground through the resistor 45. The terminal 41 may also be connected to this common ground return. Preferably the source 43 is adjusted so that the various unknown frequencies or frequencies to be calibrated, have substantially constant amplitude. When the tank circuit 18 is tuned to the fundamental or crystal frequency, the system of Fig. 2A can be adjusted so that the fundamental output frequency is of substantially the same amplitude as the fundamental frequency obtained from the master oscillator. However the amplitude of each of the harmonics up to the tenth harmonic remains commensurate with the amplitude at the fundamental frequency, as shown in Fig. 2B by the line 10*f*. Consequently, the useful range of the system is extended from the fundamental frequency to the tenth harmonic, or even higher. This result is brought about by the cross-modulation effected by the device 33 acting as a non-linear modulator or detector to produce cross-modulation between the frequencies from the sources 30 and 43. With such a detector, the signals from source 43 modulate the electron stream by varying the potential of the grid 34, and the signals from source 30 modulate the potential from cathode 32, and likewise modulate the electron stream between the cathode 32 and the anode 35. Beyond the tenth harmonic, the amplitude of the succeeding harmonics drops off rather rapidly.

Figure 3A:
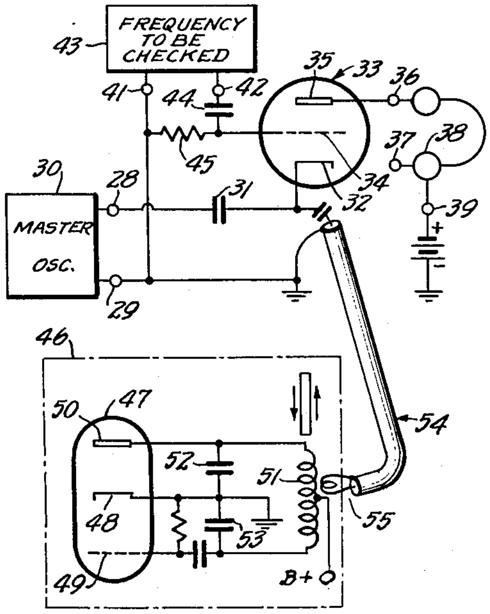
Fig. 3A shows a further modification of the invention for still further increasing the useful harmonic output range of an oscillator such as shown in Fig. 1A.
Figure 3B:
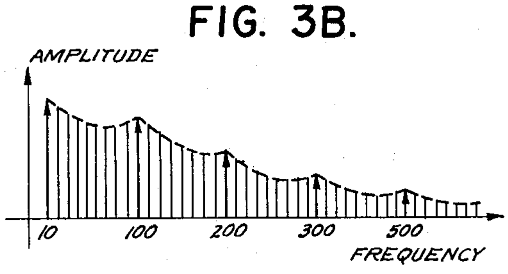
Fig. 3B is a graph showing the relation of the various output harmonics of the system of Fig. 3A.

There is shown in Fig. 3A a modification of Fig. 2A, wherein the useful range of the harmonic output can be even further extended. In Fig. 3A the parts or elements which are identical with Fig. 2A, bear the same designation numerals. In this embodiment, in addition to the master oscillator source 30 and the variable or unknown source 43, there is provided a third source of oscillations 46. In accordance with one feature of the invention, the oscillator 46 generates a fundamental frequency which is preferably a decade harmonic of the fundamental frequency of the master oscillator 30, and the frequency of oscillator 46 is locked to the frequency of oscillator 30. In other words, if the oscillator 30 has a fundamental frequency of 10 megacycles as above assumed, the oscillator 46 will have a fundamental frequency of 100 megacycles. Merely by way of example, the oscillator 46 may comprise an electron tube 47 having the cathode 48, control grid 49, and plate or anode 50, coupled for feed-back action by the split inductance 51 and the respective condensers 52, 53, to act for example as a well-known "Hartley" oscillator. Any well-known means may be provided for electrically locking the frequency of the oscillator 46 with the fundamental frequency of the crystal 10. The locking voltage in Fig. 3A results, because of the common coupling between 46 and 30, afforded by the transmission line 54 being connected to 28 and 29. Such a locked oscillator is readily operated at a ten-to-one upward multiplication of the crystal frequency. The tank circuit of oscillator 46 can be coupled by a suitable wave transmission line 54, for example of the coaxial type, the input end of which is coupled to the said tank circuit by a suitable pick-up loop 55 and the output end of which is connected to the cathode 32 and to ground, as indicated in Fig. 3A. As a result of the cross-modulating action in the non-linear detector 33 between the signals from source 30, source 43 and source 46, the output spectrum at the terminals 36, 37, yields a series of harmonics whose amplitudes are represented in Fig. 3B. As will be seen from this figure, the higher harmonics, for example from the tenth to the one-hundredth harmonics (100 megacycles to 1,000 megacycles) remain commensurate with each other, and the curve joining the amplitudes of the respective harmonics are in the nature of catenary curves as shown in Fig. 3B. For example, at the tenth harmonic, the amplitude is rather close to the amplitude at the fundamental frequency, and the amplitude does not drop off linearly between the tenth and the one-hundredth harmonics, but on the contrary as the one-hundredth harmonic is approached, the amplitude even rises as compared with the intervening harmonics mid-way between the tenth and the one-hundredth harmonics. It has been found therefore, that with such a cross-modulation arrangement, the usefulness of the system can be increased many times compared not only with the arrangement of Fig. 1A, but also many times as compared with the arrangement of Fig. 2A.

One of the important advantages of the arrangement shown in Fig. 3A, is that not only are the higher-order harmonics maintained of useful output amplitude, since only one separate path is provided to the mixer 33 from the oscillator 46 with equal transmission time in that path for the various high-order harmonics. Thus one path to the mixer is provided by the terminated transmission line 54. This line 54 presents exactly equal transmission times for all harmonics. It is especially important to shield the circuits and filter, all B— and heater leads from the high frequency locked oscillator 46 to avoid the possibility of multiple paths having differential time of transmission for certain harmonics. If such paths are allowed to exist, exact phase cancellation can take place and certain "missing beats" will result in the audio output 36 and 37. If two or more such paths were provided for transmitting the different orders of harmonics, different transmission times would be encountered in the respective paths for the higher harmonics, and some partial cancellation would result at certain frequencies.

Figure 4A:
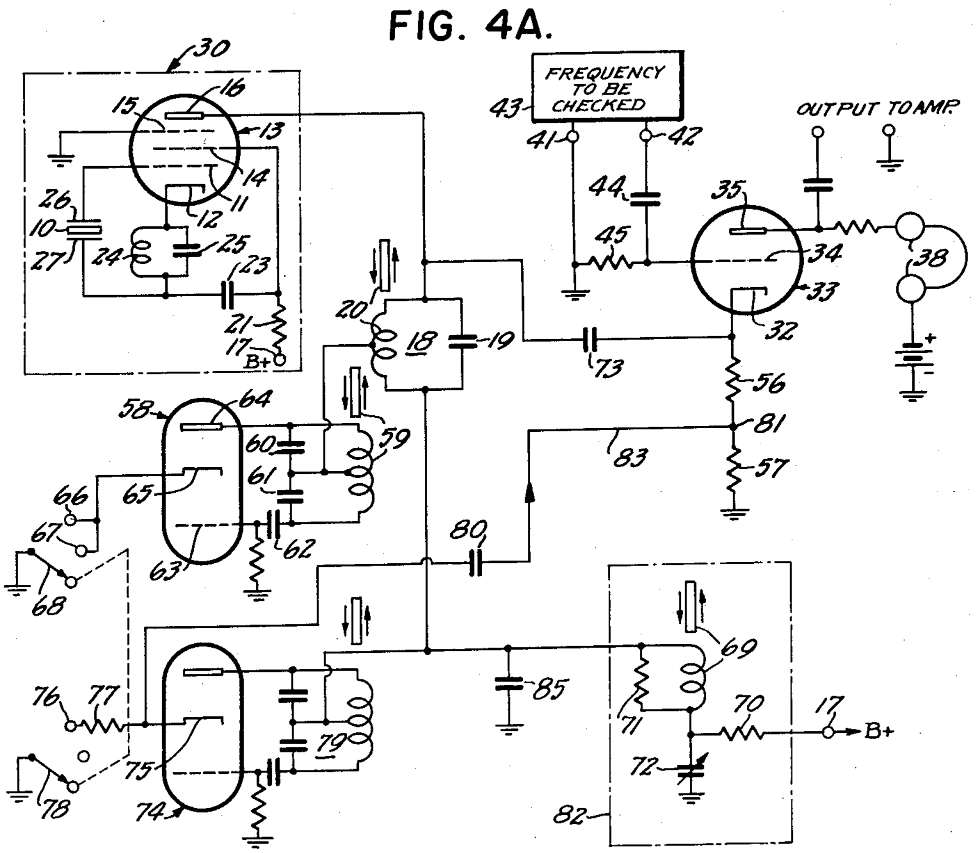
Fig. 4A represents a still further modification for dividing the spectrum into smaller frequency intervals.

While the embodiment of Fig. 3A, the system thereof is predicated upon the use of a frequency multiplication between the oscillators 30 and 46, it will be understood that the invention is not limited to frequency multiplication, but can equally be used with frequency subdivision. Such an arrangement is shown in Fig. 4A. In Fig. 4A, the master oscillator 30 may be the same as the corresponding oscillator of Fig. 3A, namely a crystal-controlled oscillator arranged to oscillate at a fundamental frequency of for example 10 megacycles. The cross-modulation is effected in a non-linear detector or product modulator 33 similar to that already described. The source 43 of unknown frequency or frequencies to be calibrated, is connected to the terminals 41, 42. The terminal 42 is coupled to the control grid 34 through the coupling condenser 44, and the terminal 41 is returned directly to ground, the grid 34 also being returned to ground through the resistor 45. The cathode 32 is returned to ground through two series-connected resistors 56, 57. Connected to the tank circuit 18 of the oscillator 30 is a sub-division oscillator 58 which is locked in frequency to the crystal 10 by virtue of the common modulating impedance afforded by the connection to 18. The oscillator 58 may be of any well-known type, illustrated in Fig. 4A as being of the "Hartley" type, comprising the split grid and plate inductance 59 with the respective shunt condensers 60, 61, the usual direct current blocking condenser 62 being provided between the coil 59 and the control grid 63. The tank circuit of the oscillator 58 is tuned to the desired sub-multiple of the frequency of crystal 10, for example it may be tuned to 1 megacycle. With such an arrangement, the oscillator 58 can easily be locked at its one-megacycle rate from the tank circuit 18, since the plate electrode 64 of oscillator 58 is driven through the direct current plate supply return circuit which includes the tank circuit 18. It has been found that with this arrangement the oscillator 58 can easily be locked over a range of one-half per cent in frequency. If the tank circuit of oscillator 58 is not sufficiently stable with temperature, any well-known temperature compensation may be provided for preventing it dropping out of lock with the crystal 10. However, even if it does accidentally drop out of lock, it will not jump in frequency by a whole integer which would lead to confusion, as is the case with multivibrators and the like. Furthermore, by using a locked oscillator, its small accidental change of frequency produces an audible signal or beat note indicating that it is not operating at its pre-assigned locked frequency. The cathode 65 of oscillator 58 is connected to points 66, 67, on a three-point switch whose contact arm 68 is connected to ground.

Thus the one-megacycle signal from oscillator 58 modulates the 10-megacycle fundamental frequency signal from the oscillator 30 by varying the load on the tank circuit 18, since the plate-to-cathode circuit of oscillator 58 is in shunt to the coil 20. It will be observed that the direct current plate power supply for the tube 13 and the tube 58 includes in series with the tank circuit 18 a one-megacycle peaking circuit comprising the adjustable inductance 69 and capacitor 85 in series with the by-pass 72. The inductance 69 is also shunt-loaded by a suitable resistor 71. This peaking circuit offers a reasonably low anti-resonant common impedance, for example less than 1,000 ohms at one megacycle in the plate power supply lead to the tubes 13, 74 and 58. However, by means of adjustment of inductance 69 and the condenser 72, this circuit can be made series-resonant to another desired frequency, for example .25 megacycle.

The 10-megacycle signal modulated by the 1-megacycle signal is coupled through a suitable coupling condenser 73 to the cathode 32.

Figure 4B:
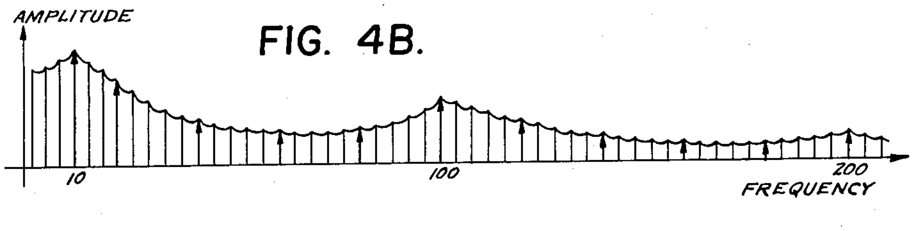
Fig. 4B is a graph illustrating the relation between the various harmonic output frequencies of the system of Fig. 4A.

There is provided an additional sub-division oscillator 74 which may be of the "Hartley" type, having its cathode 75 connected to one of the contacts 76 on a three-point switch through a resistor 77. The arm 78 of this switch is connected to ground, and is mechanically coupled to the arm 68 for unitary operation therewith. The tank circuit 79 of oscillator 74 is tuned for example to .25 megacycle, and this .25-megacycle signal is applied through a suitable coupling condenser 80 to the junction point 81 between resistors 56 and 57. The output from the mixer 33 for the various frequencies of the output spectrum are then as represented in Fig. 4B, consisting of a multiple catenary spectrum as distinguished from a mere sloping spectrum. However the spectrum of Fig. 4B is scaled down ten-to-one in frequency, as compared with the spectrum of Fig. 3B. It is not practical to attempt modulation and simultaneous locking of the dividing oscillator 74 with the crystal 10. Too tight a coupling is required, and the tendency is to pull the one-megacycle oscillator 58 out of lock. One way of avoiding this effect, would be to introduce a buffer or isolation amplifier between the oscillators 58 and 74. However, by using the series-resonant trapping circuit 82, the use of such a buffer or isolating amplifier is avoided. At one megacycle this trapping circuit offers a reasonable antiresonant common impedance with 85, for example less than 1,000 ohms in the common plate supply lead to tubes 13 and 58, but is series-resonant at .25 megacycle, and thus traps out any common coupling between oscillator 74 and the remaining oscillators at .25 megacycle. As a result, there is sufficient common impedance coupling at one megacycle to lock-in oscillator 58 over about five per cent frequency range which is more than adequate for satisfactory operation; but no modulation by oscillator 74 of the one-megacycle oscillator 58 or the 10-megacycle oscillator 13 occurs, because of the low series-resonant impedance to ground offered by 69 and 72 at .25 megacycle. Modulation of these two oscillators 13 and 58 is obtained separately through the coupling circuit comprising condenser 80 and conductor 83, which leads to the mixer cathode 32. This single path from the oscillator 74 to the mixer, overcomes the tendency to cancel certain frequencies or to produce so-called "missing beats" which would otherwise result if multiple paths were present having differential transmission times for discrete harmonics. It should be observed that the tuning of the double purpose peaking and trapping circuit 82 is not especially critical, but it reduces considerably the complexity of the circuit and the initial and maintenance costs by avoiding the use of an isolation tube as above mentioned.

Fig. 4B shows the character of the frequency spectrum as regards amplitude obtainable from the output of the mixer tube 33. It consists in general of main caternary characteristics between certain harmonics, for example between the tenth and the one-hundredth harmonic; between the one-hundredth and the two-hundredth harmonic; and the main caternaries have superposed thereon small .25 megacycle caternaries on the larger 1-megacycle caternaries.

While Fig. 4A shows a system wherein the subdivision has been carried from 1 megacycle to .25 megacycle, it will be understood that the invention is not limited to any particular range of sub-division. In fact, satisfactory instruments have actually been built containing locked sub-division oscillators as low as 5 kilocycles from a 1-megacycle crystal. For stable operation, it is not practical to sub-divide by more than ten-to-one, or to lock upwards any frequency by more than ten-to-one, since greater ratios may be too critical of adjustment for routine operation.

Summarizing the above, the instrument may be considered as consisting of three oscillators which, for purposes of illustration, may be respectively of 10 megacycles, 1 megacycle, and .25 megacycle, fundamental frequency. The 10-megacycle crystal-controlled oscillator drives the 1-megacycle sub-division oscillator in such a manner as to hold the frequency of the latter oscillator within the accuracy of the 10-megacycle crystal. This is possible since the two oscillators are harmonically related and the 1-megacycle oscillator is locked to the 10-megacycle crystal oscillator. A similar relationship exists between the 1-megacycle sub-division oscillator and the .25-megacycle sub-division oscillator, the latter being locked to the former. The combined output of the three oscillators is applied to the cathode of the mixer tube 33, wherein it is mixed with the signal from the unknown source 43. The resultant beat note can be amplified and detected by the head phones or similar device 38.

Figure 5:
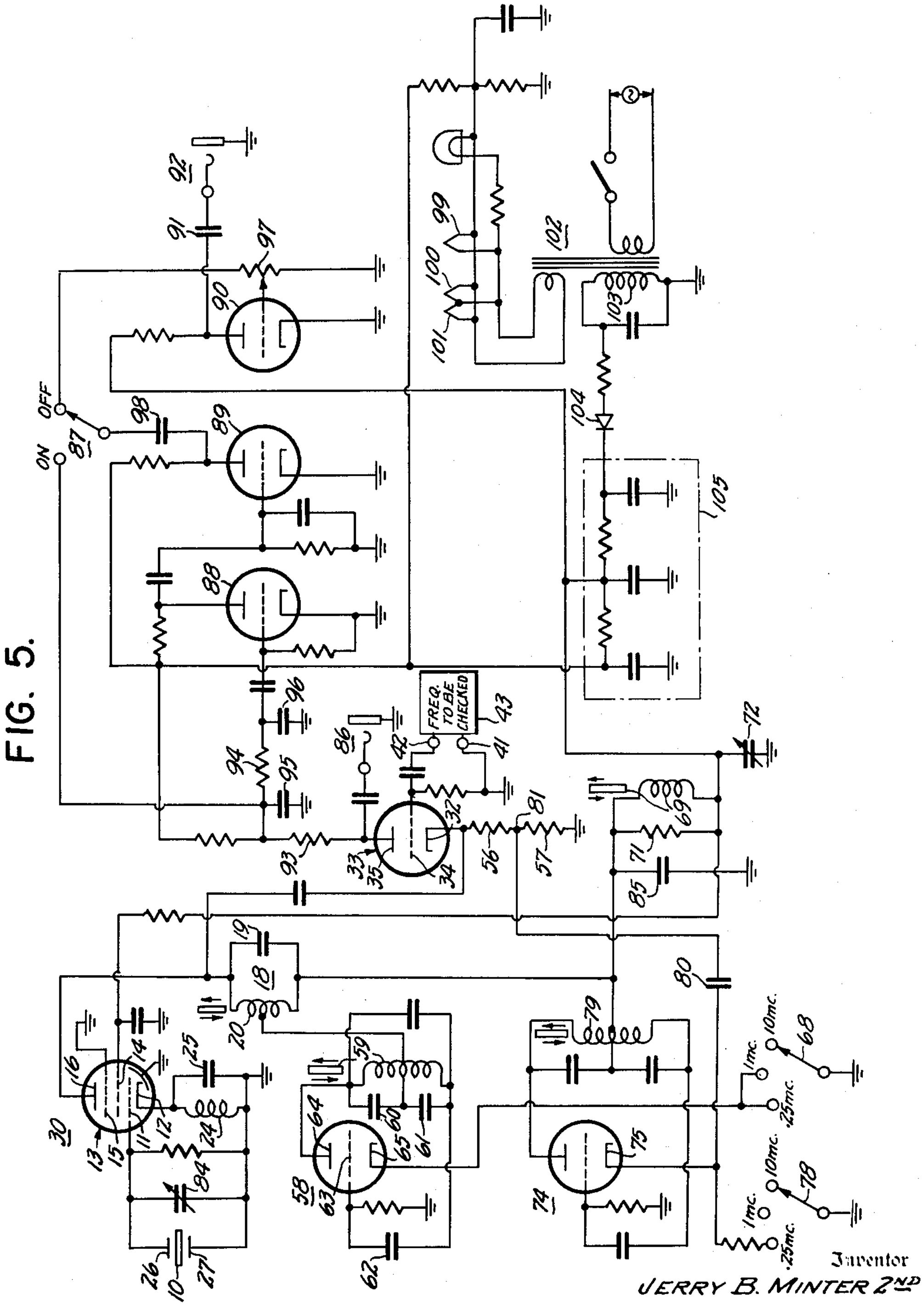
Fig. 5 is a schematic wiring diagram of a more complete wiring diagram of the invention.

Referring to Fig. 5 of the drawing, there is shown a detailed wiring diagram of a typical commercial instrument embodying the above-noted features and some additional features to be described. The parts of Fig. 5 which are identical with those of Fig. 4A, bear the same designation numerals. The 10-megacycle oscillator 30 consists, for example, of a tube 6BA6 with the screen grid thereof at radio frequency ground potential. As is well-known, a screen grid or pentode tube connected in this manner, may be considered as a triode, the second electrode acting as a bypassed plate. The cathode circuit of this oscillator consists of the inductance 24 and shunt condenser 25 to provide a resonant frequency below 10 megacycles, and therefore this combination acts like a capacitor at 10 megacycles. This capacity, together with the control grid to cathode capacity of tube 13, forms a capacity divider to the voltage appearing on the crystal 10, and thus forms a regenerative feedback. If desired, a suitable trimmer condenser 84 may be used to tune the crystal circuit to exact frequency.

The circuit of the one-megacycle oscillator 58 is ineffective when the switch arms 68 and 78 are on their 10-megacycle contacts. When the switch arms 68, 78, are operated to their 1-megacycle contacts, the return circuit of cathode 65 of the 1-megacycle oscillator tube 58 is completed. The tapped tank circuit consists of the inductance 59 and shunt capacitors 60 and 61, for tuning this tank circuit to 1 megacycle. The feedback voltage to the control grid 63 being fed through capacitor 62. The direct current plate voltage for tube 58 is supplied through the lower portion of coil 20, and this direct current voltage has the 10-megacycle voltage from the tank circuit 18 superposed thereon and applied in phase to both the control grid and plate of tube 58. Under this condition tube 58 operates as a locked oscillator only when its tank circuit is tuned to a sub-harmonic of the frequency of crystal 10, which in the particular case assumed is the tenth sub-harmonic. When it is desired to render the .25-megacycle oscillator 74 effective, the switch arms 68 and 78 are moved to their .25-megacycle contacts, thereby grounding the cathode 75 of tube 74. If desired, the triode elements of tube 74 may be enclosed in the same envelope with the triode elements of tube 58, as represented by a type 12AU7 tube. The triode 74 is connected as a conventional "Hartley" oscillator. The tap on the inductance 79 is connected to the positive terminal of the plate power supply in series with the inductance 69 which is tuned to 1 megacycle by the capacitor 85 and the by-pass 72. Application of the direct current plate voltage through inductance 69 to the plate of tube 74, results in one-megacycle superposed voltage being applied in phase to both grid and plate of tube 74. Tube 74 therefore locks under control of tube 58 as previously described for the locking of tube 58 to crystal 10, but in this instance the operation is at the fourth subharmonic of the oscillator 58.

The entire frequency spectrum output of the mixer tube 33 is connected to a suitable output jack 86, and the source 43 of the frequency to be checked or calibrated is connected to the terminals 41, 42. An additional two-position switch 87 is provided, and when the switch arm of this switch is in the "off" position, the tube 33 acts as a product detector or mixer for purposes hereinabove described. The application of the radio frequency input voltage from terminals 41, 42, to the grid 34, will result in audio beats being produced in the plate circuit of tube 33 whenever the fundamental or harmonic frequency of the injected voltage approximates the fundamental or harmonic frequency of the voltages applied to the cathode 32 from the oscillators. As a practical matter, excessively-high input voltages should be avoided at the terminals 41, 42. If desired, the beat output from tube 33 can be amplified in a three-stage amplifier comprising the cascaded amplifier tubes 88, 89, 90, whose final output can be coupled through a condenser 91 to the phone jack 92. Preferably, resistors 93, 94, and shunt condensers 95, 96, form a radio frequency filter to prevent the radio frequency voltages being applied to the grid of tube 88. By means of a suitable volume control resistor 97, the intensity of the beat note in the phones can be adjusted.

In some cases it is desirable to be able to produce an audio-modulated spectrum output at the jack 86. For this purpose the switch arm is moved to its "on" position wherein the plate of tube 89 is coupled through condenser 98 to the control grid of tube 88. Tubes 88 and 89 under this condition, form a relaxation type oscillator operating at approximately 1,000 cycles per second. It is not necessary to control the frequency or oscillation of this relaxation oscillator since its purpose is merely to provide a modulated carrier for calibrating radio receivers by the instrument of Fig. 5. The audio frequency voltage appearing across capacitor 95 is superimposed on the direct current voltage applied to the plate of the mixer tube 33. The radio frequency oscillator voltage at the plate of this tube 33 is thus modulated by the applied audio frequency from the relaxation oscillator, and appears as a modulated carrier at the output jack 86. While the triodes 33 and 88 are shown as separate triodes mounted in separate envelopes, it will be understood that they may be mounted in the same envelope, constituting for example a type 12AX7 tube. Similarly, the triodes 89 and 90 may constitute a duplex triode of the type 12AX7. The heater elements 99, 100, 101, for the twin triodes are supplied in parallel from the 6.3-volt secondary winding of a 60-cycle power transformer 102. Preferably the dual filaments for these three tubes are connected for parallel operation. The alternating current power supply from the secondary winding 103 is rectified in a suitable rectifier 104 of the contact or selenium half-wave type, and is filtered by a conventional resistance-capacity filter 105.

While the instrument shown in Fig. 5 is capable of a wide variety of uses, it is particularly useful in checking the frequency calibration of signal generators. For that purpose, the head set is plugged into the jack 92, and the switch 87 is placed in "off" position. In order to check the frequency at 10-megacycle intervals of the signal generator under test connected to the input terminals 41, 42, the following procedure is followed. The switch arms 68 and 78 are placed in their 10-megacycle position. The output of the signal generator under test is adjusted to about 10,000 microvolt level, and the said generator is tuned to the multiple-of-ten megacycles to be checked (for example, 40 megacycles). The tuning of the generator about this calibration point is effected until an audio frequency note is heard in the head phones. This note will become zero when the generator is tuned to exactly 40 megacycles, and will increase in frequency and become inaudible as the generator under test is tuned to either above or below 40 megacycles. The volume of the beat note can be adjusted by the volume control 97. This beat note will be heard whenever the generator under test is tuned through a multiple or sub-multiple of 10; i. e., 10, 20, 30, etc., or 5, 3.33, 2.5, 2, etc.

To check intermediate 1-megacycle points (for example, 42 megacycles), the switch arms 68 and 78 are placed in their 1-megacycle position, and the signal generator under test is tuned above 40 megacycles, and the beat notes counted. A beat will be heard at every megacycle point. The beat note becomes zero when the generator under test is tuned to exact multiples of 1 megacycle. For checking quarter-megacycle points, the same procedure is followed, but with the switch arms 68, 78, in their .25-megacycle position.

If the instrument is used to check the frequency calibration of a radio receiver, the modulation switch 87 is operated to its "on" position, and a short piece of wire is connected to the output jack 86. This wire will act as an antenna and provide means to couple the instrument of Fig. 5 to the antenna of the receiver under test. A pair of head phones is connected to the output terminal of the receiver under test, to facilitate calibration, or if desired, the receiver may be connected to an output meter to provide a visual check. The switch arms 68 and 78 are then placed in the position most suitable for the receiver under test. For example, if the frequency range of the receiver is above 10 megacycles, it will be convenient to determine the position of frequency points that are multiples of 10, before checking intermediate points. If the frequency range of the receiver is between 1 and 10 megacycles however, the points that are multiples of 1, may be checked before determining the position of the quarter-megacycle calibration points. The receiver under test is then tuned to the fundamental or required harmonic of the oscillator for a maximum signal in the head phones connected to the receiver.

Analogous procedures may be followed in checking other instruments, such as radio transmitters, and the like.

Figure 6:
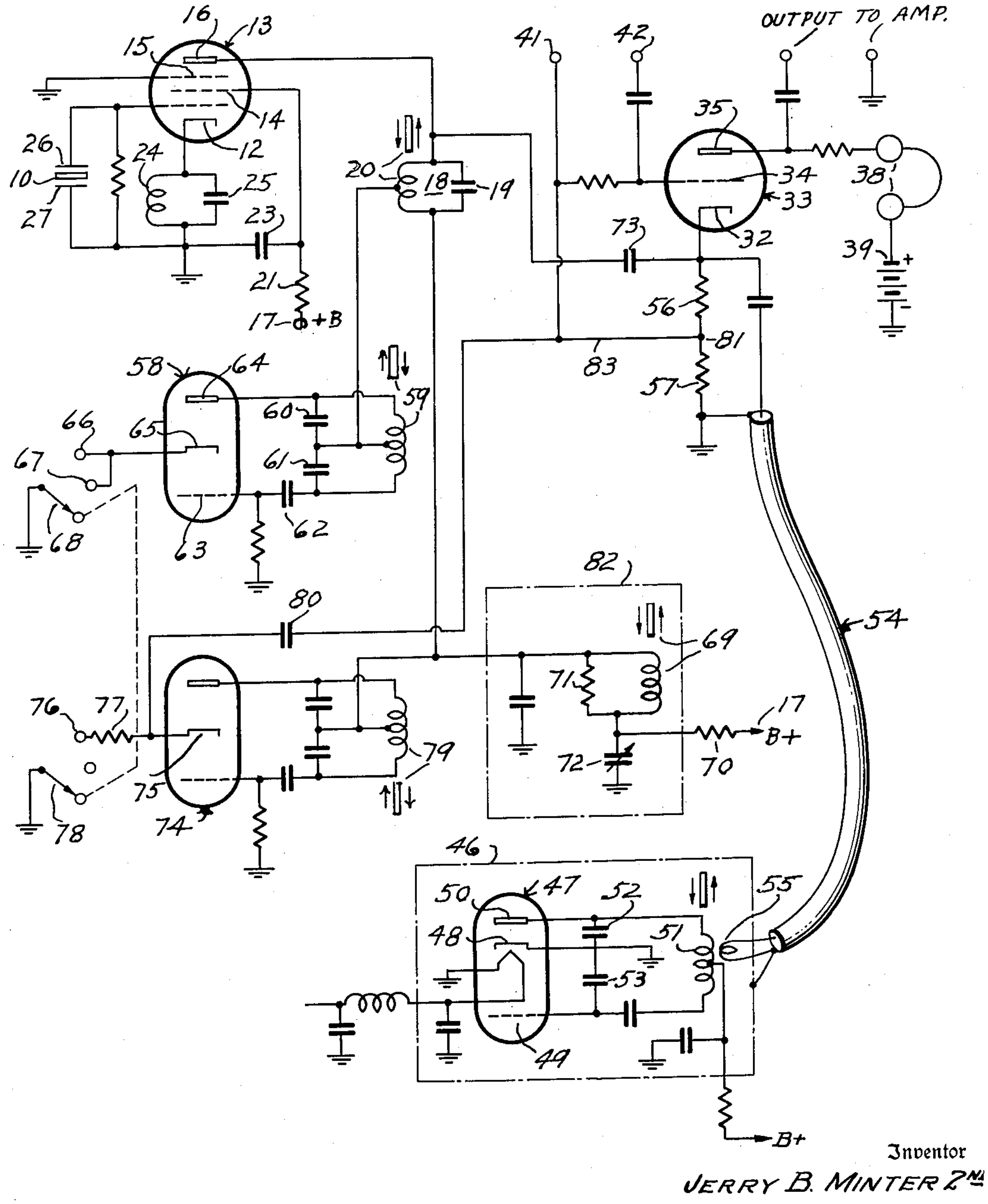
Fig. 6 is a further modification of the invention to augment output at the higher frequencies.

While certain particular embodiments have been described, it will be understood that various changes and modifications may be made therein without departing from the spirit and scope of the invention, it being understood of course that the invention is in no way limited to the particular dimensions, circuit values, or frequencies which have been referred to herein merely by way of explanation. For example, the cathode 32 of the mixer is connected to the output of the oscillator by the terminated transmission line 54 as in Fig. 3A and the said cathode 32 is returned to ground through the series resistors 56, 57, as in Fig. 4A. In other words, Fig. 6 represents a combination of Figs. 3A and 4A, and the parts of Fig. 6 which are identical in function with those of Figs. 3A and 4A, bear the same designation numerals.

What is claimed is:

1. A frequency meter of the heterodyne kind comprising in combination, a master oscillator of highly stabilized fundamental frequency accompanied by harmonics each of whose amplitudes is normally markedly lower than the fundamental frequency, a free-running oscillator, means to lock the frequency of said free-running oscillator to said fundamental frequency, and a mixer device upon which the signals from both the stabilized oscillator and the free-running oscillator are separately but simultaneously impressed for cross-modulation, said modulator device having an output circuit wherein there are produced harmonics of said fundamental frequency whose amplitudes are markedly increased over the corresponding harmonics from said master oscillator.

2. A frequency meter of the heterodyne kind comprising in combination, a crystal-controlled master oscillator for generating a fundamental frequency accompanied by harmonics each of whose amplitudes is markedly lower than the amplitude of the fundamental frequency, a free-running oscillator, circuit connections between said oscillators for intermodulation and also for locking the frequency of the free-running oscillator to the master oscillator, a source of signals to be compared with said crystal frequencies, and a non-linear mixer network upon which the intermodulated frequencies from the master oscillator and the free-running oscillator and also the signals from said source are simultaneously but separately impressed for cross modulation, said network having an output section wherein said harmonics are produced with markedly increased amplitude as compared with the corresponding harmonics from said master oscillator.

3. A frequency meter of the heterodyne kind comprising in combination, a crystal-controlled master oscillator for generating a fundamental frequency and harmonics each of whose amplitudes is normally markedly lower than the amplitude of the fundamental frequency, a frequency mixer network of the cross-modulation kind having an input terminal for connection to a source of frequency to be checked, a free-running oscillator generating a fundamental frequency which is integrally related to the master oscillator fundamental, means for electrically locking said fundamental frequencies, means to intermodulate the frequency spectrum of the master oscillator with the frequency spectrum of the free-running oscillator, means to apply the intermodulated spectra to said mixer network to cross-modulate with said frequency to be checked, and signal-producing means connected to the output of said mixer network to determine the frequency relation between said frequency to be checked and the nearest harmonic of the intermodulated spectrum.

4. A system of the heterodyne kind for generating a frequency spectrum comprising in combination a crystal-controlled master oscillator, a free-running oscillator whose fundamental frequency is electrically locked to the crystal frequency, means including a mixer device of the cross-modulation kind, and means connecting both of said oscillators over separate paths to said mixer device to intermodulate the spectrum of the master oscillator with the spectrum of the free-running oscillator to produce a similar output frequency spectrum wherein the amplitudes of the higher-order harmonics are greatly increased in comparison with the higher-order harmonics obtainable from said master oscillator alone.

5. A system of the heterodyne kind for generating a frequency spectrum comprising in combination a crystal-controlled master oscillator whose higher-order harmonics normally have amplitudes very much less than the fundamental, a free-running oscillator, each of said oscillators having a tank circuit tuned to its respective fundamental oscillator frequency, means including the tank circuit of the master oscillator to electrically lock the fundamental frequency of the free-running oscillator to the fundamental frequency of the master oscillator, and a frequency combining network including a mixer of the cross-modulation kind, means for impressing the frequency spectrum from the master oscillator and the frequency spectrum from the free-running oscillator simultaneously upon said network to produce a similar frequency spectrum output wherein the higher-order harmonics are greatly increased in amplitude compared with the higher-order harmonics obtainable from said master oscillator alone.

6. A system according to claim 5 in which the tank circuit of the master oscillator is provided with means connecting it to the input and output circuits of the free-running oscillator to intermodulate the spectra of the two oscillators while effecting said electrical locking.

7. A system of the heterodyne kind for generating a frequency spectrum comprising in combination a crystal-controlled master oscillator, a free-running oscillator, each of said oscillators having a tunable tank circuit, means to tune the tank circuit of the free-running oscillator to a fundamental frequency which is an integral higher multiple of the fundamental frequency of the master oscillator, means electrically locking the fundamental frequency of the free-running oscillator to the fundamental crystal frequency, means to intermodulate the spectra from the two oscillators, and an output mixer network including a cross-modulation device upon which the intermodulated spectra are impressed to derive a similar frequency spectrum but with the higher-order harmonics of greatly increased amplitude as compared with the higher-order harmonics obtainable from the master oscillator alone.

8. A system of the heterodyne kind for generating a frequency spectrum comprising in combination a crystal-controlled master oscillator, a free-running oscillator, each of said oscillators having a tunable tank circuit, means to tune the tank circuit of the free-running oscillator to a fundamental frequency which is an integral lower sub-multiple of the fundamental frequency of the master oscillator, means electrically locking the fundamental frequency of the free-running oscillator to the fundamental crystal frequency, means to intermodulate the spectra from the two oscillators, and an output mixer network including a cross-modulation device upon which the intermodulated spectra are impressed to derive a similar frequency spectrum but with the higher-order harmonics of greatly increased amplitude as compared with the higher-order harmonics obtainable from the master oscillator alone.

9. A system according to claim 7 in which the tank circuit of the master oscillator is connected across the anode and control grid of said free-running oscillator.

10. A system according to claim 7 in which the tank circuit of the master oscillator is connected in like phase to the control grid and anode of the free-running oscillator.

11. A system according to claim 7 in which said mixer network comprises a grid-controlled electron tube, means for applying the said intermodulated spectra to the cathode of said tube, and means to connect a source of frequency to be checked to the control grid of said tube.

12. A frequency calibrator of the heterodyne kind comprising in combination, a master oscillator of highly-stabilized fundamental frequency accompanied by harmonics each of whose amplitudes is normally markedly lower than the fundamental frequency, a first free-running oscillator, a second free-running oscillator, means for electrically locking the fundamental frequency of both the free-running oscillators to the fundamental frequency of the master oscillator, a cross-modulation device, means to intermodulate the spectra of the master oscillator and one of the free-running oscillators, means to apply over one path to said cross-modulation device the said intermodulated spectra, and means for simultaneously applying to said cross-modulation device over a separate path the spectra of the other free-running oscillator.

13. A calibrator according to claim 12 in which each of said oscillators has a respective tank circuit tuned to the fundamental frequency of its respective oscillator, and means connecting the tank circuit of the master oscillator to the tank circuits of the free-running oscillators to effect said locking.

14. In a system of the heterodyne type and in combination, a crystal-controlled master oscillator having a tank circuit tuned to the master oscillator fundamental frequency, a first free-running oscillator, a second free-running oscillator, each of said free-running oscillators having a respective tank circuit tuned to the fundamental frequency of its respective oscillator, a circuit connection between the first free-running oscillator and the tank circuit of the master oscillator to intermodulate respective spectra while electrically locking the fundamental frequency of the said first free-running oscillator to the fundamental frequency of the master oscillator, a connection from the tank circuit of the master oscillator to the second free-running oscillator to electrically lock their respective fundamental frequencies, said connection including means to isolate the master oscillator spectrum and the spectrum of the said first free-running oscillator from intermodulation with said second free-running oscillator, a non-linear modulation network including a cross-modulation device, means to apply the said intermodulated spectra over one path to said network, and means to apply the spectrum of the said second free-running oscillator over an independent path to said network to produce in the output of said network a frequency spectrum similar to that of the master oscillator but with the higher-order harmonics of much greater amplitude than those of the master oscillator.

15. A system according to claim 14, in which the output anodes of all the oscillators are connected to a common direct current plate power supply circuit, said circuit including a peaking network for presenting a substantial impedance at the fundamental frequency of the first free-running oscillator, and a trap for shunting away from said common circuit the fundamental frequency of the second free-running oscillator.

16. A system according to claim 14, in which said mixer network comprises a grid-controlled electron tube having its cathode potential varied by the said intermodulated spectra and also by the spectrum from said second free-running oscillator, and means to connect a frequency to be checked to a control grid of said tube.

17. A system according to claim 14, in which said first free-running oscillator has a fundamental frequency which is an integral sub-multiple of the fundamental frequency of the master oscillator, and the second free-running oscillator has a fundamental frequency which is an integral sub-multiple of the fundamental frequency of the first free-running oscillator.

18. A system according to claim 14 in which said first free-running oscillator has a fundamental frequency which is an integral higher multiple of the fundamental frequency of the master oscillator, and the second free-running oscillator has a fundamental frequency which is an integral higher multiple of the fundamental frequency of the first free-running oscillator.

19. In a calibrating system of the type described and in combination, a crystal-controlled master oscillator, a first free-running oscillator having a fundamental frequency which is an integral multiple of the master oscillator fundamental frequency, means electrically locking the master oscillator with the free-running oscillator, a second free-running oscillator having a fundamental frequency which is an integral multiple of the master oscillator fundamental frequency which integral multiple is a different integral multiple from that of the first free-running oscillator, a grid-controlled modulator tube, means to connect a source of frequency to be checked to a control grid of said tube, a first path connecting the intermodulated output of the master oscillator and the first free-running oscillator to the cathode of said tube, and a second independent path for connecting the output of the second free-running oscillator to the cathode of said tube to prevent missing beats that would otherwise tend to occur between certain harmonics of said oscillators.

20. In a system of the heterodyne type, a crystal-controlled oscillator, a first free-running oscillator, a second free-running oscillator, each of said oscillators having a respective tank circuit, means locking the first free-running oscillator to the master oscillator to produce a fundamental frequency locked to the fundamental frequency of the master oscillator and having an integral ratio thereto, means locking the second free-running oscillator to the master oscillator to produce a fundamental frequency which is also locked to the fundamental frequency of the master oscillator and which has an integral ratio to the fundamental frequency of the first free-running oscillator, a common plate power supply circuit for all said oscillators, said circuit including an impedance for causing the output of the first free-running oscillator to plate-modulate the master oscillator, means for isolating the output of the second free-running oscillator against modulation of either the master oscillator or the first free-running oscillator, and a mixer network upon which the intermodulated outputs of the master oscillator and the first free-running oscillator are applied over one path, and upon which the output of the second free-running oscillator is applied over an independent path for cross-modulation in said mixer.

21. A system according to claim 20 in which the output of said mixer network is connected to an audio-frequency amplifier of the indirectly-heated type, a source of alternating power current connected to said oscillators and to said amplifier tube, and means to bias the heater element of said amplifier tube positively with respect to ground while simultaneously by-passing it to ground to reduce the per cent of alternating current hum in the output of said amplifier.

References Cited in the file of this patent

UNITED STATES PATENTS

| | | |
|---|---|---|
| 2,248,481 | Schuttig | July 8, 1941 |
| 2,393,717 | Speaker | Jan. 29, 1946 |
| 2,451,320 | Clammer et al. | Oct. 12, 1948 |
| 2,519,765 | Jeffries et al. | Aug. 22, 1950 |

OTHER REFERENCES

Terman: Radio Engineering, 3rd edition, page 282.